(12) United States Patent
Shinno

(10) Patent No.: US 8,970,926 B2
(45) Date of Patent: Mar. 3, 2015

(54) DOCUMENT READING APPARATUS AND METHOD OF CONTROLLING THE SAME

(71) Applicant: Konica Minolta, Inc., Chiyoda-ku (JP)

(72) Inventor: Tatsuya Shinno, Toyokawa (JP)

(73) Assignee: Konica Minolta, Inc., Chiyoda-Ku, Tokyo (JP)

( * ) Notice: Subject to any disclaimer, the term of this patent is extended or adjusted under 35 U.S.C. 154(b) by 0 days.

(21) Appl. No.: 13/864,740

(22) Filed: Apr. 17, 2013

(65) Prior Publication Data

US 2013/0293935 A1    Nov. 7, 2013

(30) Foreign Application Priority Data

May 7, 2012    (JP) ................. 2012-105861

(51) Int. Cl.
| | | |
|---|---|---|
| H04N 1/04 | (2006.01) | |
| H04N 1/40 | (2006.01) | |
| G03G 15/08 | (2006.01) | |
| G03G 15/20 | (2006.01) | |
| G03G 15/02 | (2006.01) | |
| H04N 1/10 | (2006.01) | |
| G03G 15/00 | (2006.01) | |
| H04N 1/00 | (2006.01) | |
| H04N 1/12 | (2006.01) | |
| H04N 1/193 | (2006.01) | |

(52) U.S. Cl.
CPC ............... *H04N 1/10* (2013.01); *G03G 15/602* (2013.01); *H04N 1/00909* (2013.01); *H04N 1/12* (2013.01); *H04N 1/193* (2013.01); *H04N 2201/0081* (2013.01)
USPC ........... 358/496; 358/498; 358/483; 358/474; 358/461; 399/252; 399/327; 430/58.75

(58) Field of Classification Search
USPC ................. 358/461, 483, 474; 399/252, 327; 430/58.75
See application file for complete search history.

(56) References Cited

U.S. PATENT DOCUMENTS

| | | | |
|---|---|---|---|
| 2002/0101625 A1 | 8/2002 | Shouji | |
| 2008/0138728 A1* | 6/2008 | Sugino et al. | 430/58.75 |
| 2008/0226363 A1* | 9/2008 | Tateishi et al. | 399/327 |
| 2009/0103950 A1* | 4/2009 | Nakayama et al. | 399/252 |
| 2010/0039681 A1* | 2/2010 | Zhu et al. | 358/474 |

(Continued)

FOREIGN PATENT DOCUMENTS

| | | |
|---|---|---|
| JP | 4-153140 A | 5/1992 |
| JP | 2004-236252 A | 8/2004 |

(Continued)

OTHER PUBLICATIONS

Copy of Japanese Office Action dated Aug. 26, 2014 issued in corresponding Japanese Patent Appln. No. 2012-105861, with English translation (8 pages).

*Primary Examiner* — Charlotte M Baker
*Assistant Examiner* — Rury Grisham
(74) *Attorney, Agent, or Firm* — Buchanan Ingersoll & Rooney PC

(57) ABSTRACT

A document reading apparatus includes a conveyance unit for conveying a document and a reading unit for reading an image of a document. In the document reading apparatus, the reading unit includes a platen glass. The conveyance unit allows a cleaning member of a cleaning roller to start contact with the front end in a conveyance direction of a document, on the platen glass, upstream in the conveyance direction from a reading position.

10 Claims, 14 Drawing Sheets

(56) References Cited

U.S. PATENT DOCUMENTS

2011/0102865 A1   5/2011  Ishida et al.
2011/0164290 A1*  7/2011  Nishikawa .................... 358/461
2011/0199653 A1*  8/2011  Nishikawa .................... 358/483

FOREIGN PATENT DOCUMENTS

| JP | 2005-132615 A | 5/2005 |
| JP | 2005-204007 A | 7/2005 |
| JP | 2010-93350 A  | 4/2010 |

* cited by examiner

DOCUMENT READING APPARATUS AND METHOD OF CONTROLLING THE SAME

This application is based on Japanese Patent Application No. 2012-105861 filed with the Japan Patent Office on May 7, 2012, the entire content of which is hereby incorporated by reference.

BACKGROUND OF THE INVENTION

1. Field of the Invention

The present disclosure relates to control of a document reading apparatus including a member for cleaning a platen glass.

2. Description of the Related Art

In sheet through-type automatic document reading apparatuses, an image on the document surface of a document conveyed by conveyance means is read by stationary image reading means. Those apparatuses are advantageous in that they can be reduced in size and in cost and noise and have high productivity when compared with platen set-type apparatuses which read a document at a stop by moving image reading means.

In the case of the sheet through-type apparatuses, the image reading means requires a structure fixed at a particular position and adjusts a focus on a document surface through a platen glass. In the sheet through-type apparatuses, therefore, the quality of the read image is easily influenced by foreign matters such as paper dust and dirt which obstruct the reading position. This is because, for example, a streak-like image noise (hereinafter referred to as "streak noise") occurs at a portion of the read image that corresponds where light is blocked by foreign matters such as paper dust or dirt left on the document reading surface such as a platen glass.

When a document having information recorded thereon is conveyed in the document reading apparatuses, the conveyance of paper inevitably causes paper dust to adhere on the reading surface. In this respect, the document reading apparatuses require means for removing foreign matters such as paper dust on the document reading surface. In situations where an excessive amount of paper dust is produced, the document reading apparatuses further require means for preventing streak noise.

In view of the foregoing situations, a variety of document reading apparatuses having a member for cleaning a paper conveyance path have been proposed. For example, Japanese Laid-Open Patent Publication No. 2005-204007 discloses a document reading apparatus having a cleaning member. The cleaning member is provided at a platen roller. The document reading apparatus changes the state of the cleaning member between a state in which it abuts on a platen glass and a state in which it does not abut on the platen glass. The document reading apparatus brings the cleaning member into abutment with the platen glass in a period during which no document is conveyed (for example, a period immediately before document conveyance operation and a period immediately after the end of conveyance operation). The platen glass surface is thus cleaned in the period during which no document is conveyed.

Japanese Laid-Open Patent Publication No. 04-153140 discloses a paper conveyance apparatus having cleaning means. The cleaning means includes a shaft provided at a position opposed to an optical system. The shaft has a brush attached thereto. The paper conveyance apparatus periodically rotates the shaft thereby carrying out periodical cleaning for removing paper dust accumulated in a conveyance path.

The apparatuses in the related art as described above perform cleaning such that the cleaning member or the brush abuts on the platen glass between document sheets passing through on the platen glass. The cleaning member thus comes into abutment with the platen glass in the absence of document paper on the platen glass. As a result, after cleaning, paper dust may be left on the platen glass upstream in the conveyance direction from the point where the conveyed document starts coming into contact with the platen glass. When a document is newly conveyed in a state in which paper dust left upstream underlies the document, streak noise as described above may occur in an image of the document.

SUMMARY OF THE INVENTION

The present disclosure is made in view of the above-mentioned situations and aims to remove paper dust at a document reading position more reliably in a document reading apparatus.

According to an aspect, a document reading apparatus is provided which includes a conveyance unit for conveying a document and a reading unit for reading an image of a document. The reading unit includes a platen glass. The conveyance unit includes a removal unit for removing foreign substances on the platen glass, and a processor configured to control conveyance of a document on the platen glass and operation of the removal unit. The removal unit includes a cleaning roller arranged to be able to rotate on the platen glass. The cleaning roller includes a cleaning roller body arranged along the platen glass throughout an entire length of the platen glass in a direction intersecting a conveyance direction of a document by the conveyance unit, for rotating not in contact with the platen glass, and a cleaning member arranged on an outer periphery of the cleaning roller body along the platen glass throughout the entire length of the platen glass in the direction intersecting the conveyance direction. The cleaning member is flexed when coming into contact with the platen glass. The processor is configured to allow the cleaning member to start removal of foreign substances on the platen glass by bringing the cleaning member into contact with a front end in the conveyance direction of a document conveyed by the conveyance unit, on the platen glass, upstream in the conveyance direction from a reading position by the reading unit.

Preferably, the processor is configured to allow the cleaning member to move such that the cleaning member comes into contact with the front end of a document on the platen glass and the cleaning member thereafter overtakes the document conveyed on the platen glass.

Preferably, the processor is configured to allow the cleaning member to move such that the cleaning member starts contact with a document conveyed by the conveyance unit, on the platen glass, upstream from the reading position at least by a size with which cleaning is required.

Preferably, a component Vr in the conveyance direction of a rotational velocity of the cleaning roller satisfies the following expression (A):

$$Vr \times t < Vp \times t + L1 \quad (A)$$

where Vp is a conveyance velocity of a document by the conveyance unit, L1 is a conveyance interval between documents, and t is a time during which the cleaning member is in abutment with the platen glass when the cleaning roller is rotated according to Vr.

Preferably, the processor is configured to allow the cleaning member to move such that contact between the cleaning member and a document conveyed by the conveyance unit is released downstream in the conveyance direction from the reading position.

According to another aspect, a method of controlling a document reading apparatus is provided. The document reading apparatus includes a conveyance unit for conveying a document and a reading unit for reading an image of a document. The reading unit including a platen glass. The conveyance unit includes a removal unit for removing foreign substances on the platen glass, and a processor configured to control conveyance of a document on the platen glass and operation of the removal unit. The removal unit includes a cleaning roller arranged to be able to rotate on the platen glass. The cleaning roller includes a cleaning roller body arranged along the platen glass throughout an entire length of the platen glass in a direction intersecting a conveyance direction of a document by the conveyance unit, for rotating not in contact with the platen glass, and a cleaning member arranged on an outer periphery of the cleaning roller body along the platen glass throughout the entire length of the platen glass in the direction intersecting the conveyance direction. The cleaning member is flexed when coming into contact with the platen glass. The method includes the step of allowing, by the processor, the cleaning member to start removal of foreign substances on the platen glass by bringing the cleaning member into contact with a front end in the conveyance direction of a document conveyed by the conveyance unit, on the platen glass, upstream in the conveyance direction from a reading position by the reading unit.

Preferably, the method further includes the step of allowing, by the processor, the cleaning member to move such that the cleaning member comes into contact with the front end of a document on the platen glass and the cleaning member thereafter overtakes the document conveyed on the platen glass.

Preferably, the method further includes the step of allowing, by the processor, the cleaning member to move such that the cleaning member starts contact with a document conveyed by the conveyance unit, on the platen glass, upstream from the reading position at least by a size with which cleaning is required.

Preferably, a component Vr in the conveyance direction of a rotational velocity of the cleaning roller satisfies the following expression (A):

$$Vr \times t < Vp \times t + L1 \quad (A)$$

where Vp is a conveyance velocity of a document by the conveyance unit, L1 is a conveyance interval between documents, and t is a time during which the cleaning member is in abutment with the platen glass when the cleaning roller is rotated according to Vr.

Preferably, the method further includes the step of allowing, by the processor, the cleaning member to move such that contact between the cleaning member and a document conveyed by the conveyance unit is released downstream in the conveyance direction from the reading position.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of a document reading apparatus will be described with reference to the figures. In the following description, the same parts and components are denoted with the same reference signs. Their names and functions are also the same.

<Overall Configuration of Document Reading Apparatus>

Figure 1:
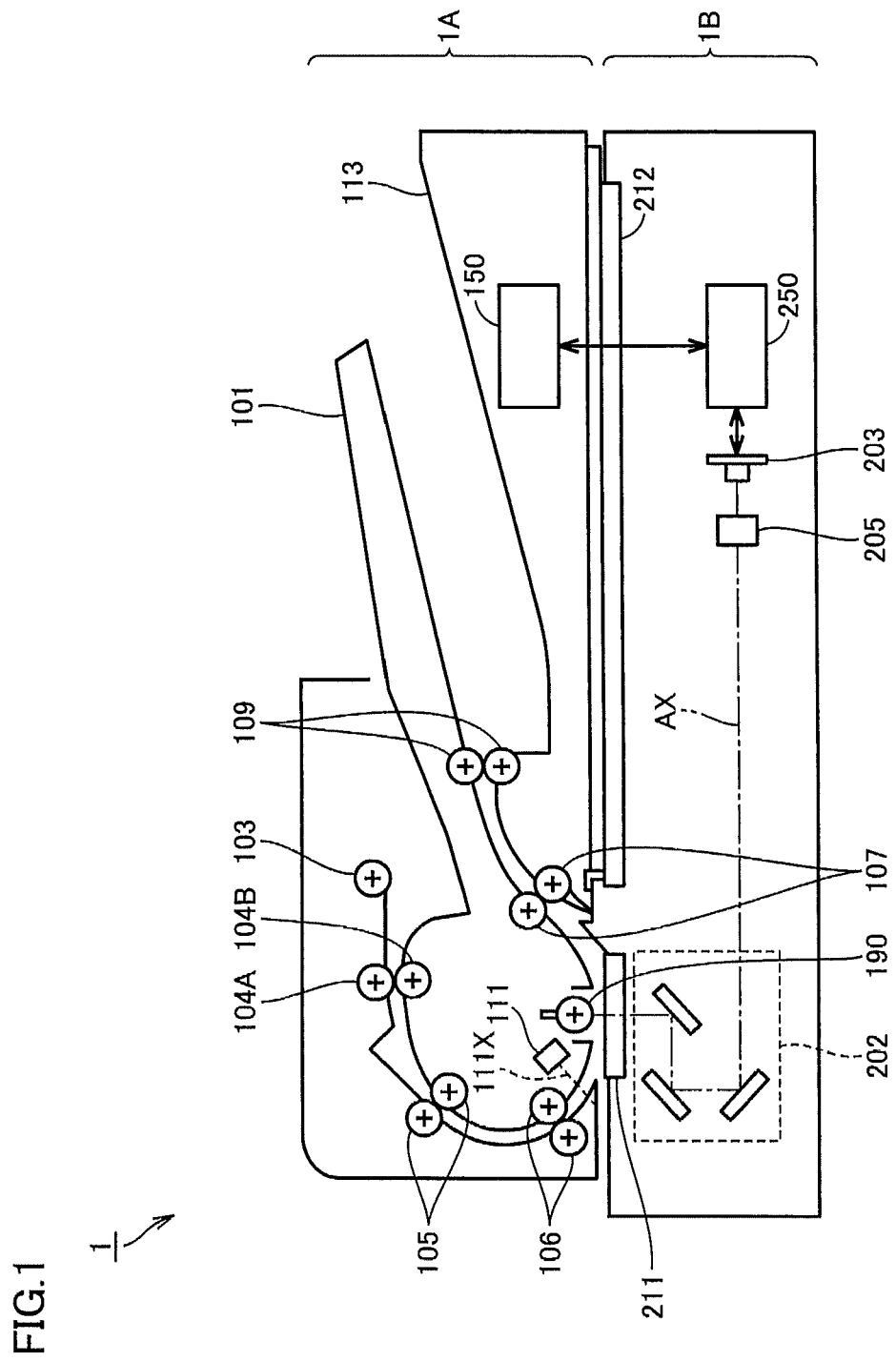
FIG. 1 shows a specific example of an apparatus configuration of a document reading apparatus.

Referring to FIG. 1, an example of a configuration of a document reading apparatus is described. FIG. 1 shows a specific example of an apparatus configuration of the document reading apparatus.

As shown in FIG. 1, document reading apparatus 1 includes an ADF unit 1A and a reading unit 1B. ADF unit 1A includes a sheet through-type ADF and conveys a document loaded in a paper feed tray 101 to be read by reading unit 1B.

ADF unit 1A has paper feed tray 101 for loading a document before conveyance and a paper discharge tray 113 for discharging a document after conveyance. ADF unit 1A has a document conveyance path between paper feed tray 101 and paper discharge tray 113.

At the boundary between paper feed tray 101 and the conveyance path, a pick-up roller 103, a paper feed roller 104A, and a separating roller 104B are provided. A document stack loaded in paper feed tray 101 is picked up by pick-up roller 103, separated sheet by sheet by paper feed roller 104A and separating roller 104B, and output to the conveyance path.

In the following description, the direction from paper feed tray 101 to paper discharge tray 113 is also referred to as a document conveyance direction in the conveyance path. In the conveyance path, the side closer to paper feed tray 101 is also referred to as "upstream in the conveyance direction" and the side closer to paper discharge tray 113 is referred to as "downstream in the conveyance direction". In the conveyance path, the upstream side is also referred to as "front" and the downstream side is also referred to as "back".

A pair of registration rollers 105 is provided in the conveyance path to sandwich the conveyance path along the conveyance direction. The document fed to registration rollers 105 is skew-corrected by registration rollers 105. After being skew-corrected, the document is conveyed to a platen glass 211 in reading unit 1B.

ADF unit 1A includes a pair of pre-reading rollers 106 and a pair of post-reading rollers 107. Pre-reading rollers 106 are positioned upstream from platen glass 211. Post-reading rollers 107 are positioned downstream from platen glass 211.

Rotation of pre-reading rollers 106 and post-reading rollers 107 allows the document conveyed to pre-reading rollers 106 to pass through on platen glass 211 and to be conveyed downstream from platen glass 211. With the document conveyed in this way, the image on the surface on the reading unit 1B side of the document is read by reading unit 1B.

In the conveyance path, a pre-reading sensor 111 is provided downstream from pre-reading rollers 106 and upstream from post-reading rollers 107. In FIG. 1, a line 111X indicates the optical axis of pre-reading sensor 111. Pre-reading sensor 111 detects whether there exist a document on the optical axis.

In the conveyance path, a cleaning roller 190 is provided between the detection position of pre-reading sensor 111 and post-reading rollers 107. Cleaning roller 190 can remove foreign substances such as paper dust on platen glass 211.

A pair of paper discharge rollers 109 is provided at the boundary between the conveyance path and paper discharge tray 113. Rotation of paper discharge rollers 109 allows the document, having the image read by reading unit 1B, to be discharged to paper discharge tray 113.

ADF unit 1A further includes a motor (motors 301 to 305 described later) for driving each roller. ADF unit 1A also includes a control device 150 for controlling operation of these motors.

Reading unit 1B includes a not-shown exposure lamp, a mirror group 202 including a plurality of mirrors, a CCD (Charge Coupled Device) 203, an imaging lens 205 provided on the optical axis formed between mirror group 202 and CCD 203, and a CCD control device 250. In FIG. 1, a line AX indicates the optical axis formed between mirror group 202 and CCD 203.

When a document passes through the reading position on platen glass 211, the exposure lamp applies light onto the surface of the document. Reflection light from the surface of the document is reflected by mirror group 202, introduced to CCD 203, and received by CCD 203.

The operation as described above in reading unit 1B is controlled by CCD control device 250. CCD control device 250 receives input of a signal based on the received light from CCD 203 and generates image data of the document.

Control device 150 can communicate with CCD control device 250. CCD control device 250 receives information specifying a timing for conveying a document in ADF unit 1A from control device 150 and controls the timings for exposure for the document in reading unit 1B and for generating image data of the document in accordance with the received information.

Reading unit 1B can also read an image of a document not conveyed by ADF unit 1A. In order to do so, reading unit 1B further includes a platen glass 212 on which a document is placed. The user places a document on platen glass 212 and inputs an instruction for copy. Mirror group 202 is then driven in the horizontal direction to read an image of the document on platen glass 212. Accordingly, reflection light from the entire document on platen glass 212 is introduced to CCD 203. Reading unit 1B generates image data of the document based on the reflection light.

<Cleaning Roller>

Figure 2:
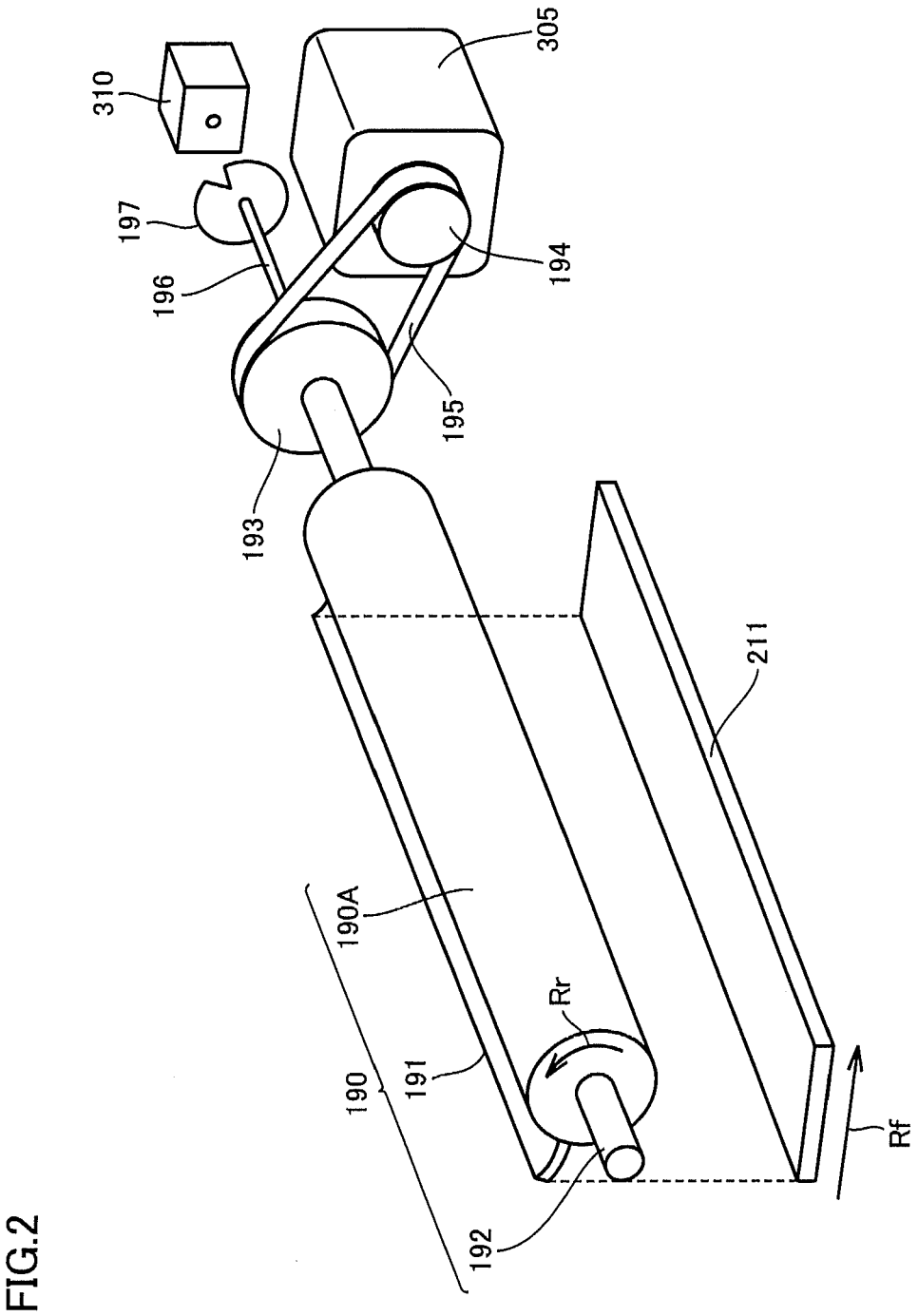
FIG. 2 illustrates a configuration on the periphery of a cleaning roller in the document reading apparatus in FIG. 1.

Referring to FIG. 2, a configuration on the periphery of cleaning roller 190 in document reading apparatus 1 is described. FIG. 2 illustrates a configuration on the periphery of cleaning roller 190 in FIG. 1.

As shown in FIG. 2, cleaning roller 190 includes a shaft 192, a cleaning roller body 190A provided on the outer periphery of shaft 192, and a cleaning member 191 provided on the outer periphery of cleaning roller body 190A. Cleaning member 191 has at least such a size that it can abut on the entire cleaning glass 211 in the direction intersecting the document conveyance direction as indicated by arrow Rf. Cleaning roller 190 is an example of a removal unit for removing foreign substances on the platen glass. Cleaning roller body 190A is an example of a support body of the cleaning member.

A driving pulley 193 is coupled to one end of shaft 192. Driving pulley 193 is coupled to a motor pulley 194 by means of a belt 195. The driving force of motor 305 is thus transmitted to shaft 192 through motor pulley 194 and belt 195. Cleaning roller body 190A and cleaning member 191 are rotated with rotation of shaft 192.

Driving pulley 193 is further coupled to one end of a shaft 196. The other end of shaft 196 is coupled to a detection piece 197. Detection piece 197 has an approximately disk-like shape and partially has a notch. Detection piece 197 is rotated in the direction of arrow Rr similarly, with the rotation in the direction of arrow Rr of cleaning roller body 190A as described later. The position of the notch portion of detection piece 197 is changed with the rotation.

ADF unit 1A further includes a rotational position sensor 310. Rotational position sensor 310 is arranged such that its optical detection part can face detection piece 197.

Arrow Rr indicates the rotation direction of cleaning roller body 190A. In ADF unit 1A, the driving force of motor 305 rotates motor pulley 194, thereby rotating cleaning roller body 190A, shaft 192, driving pulley 193, shaft 196, and detection piece 197.

A part of detection piece 197 that faces the detection position of rotational position sensor 310 changes with rotation of detection piece 197. Specifically, the facing part alternates between the notch portion and the other portion. Accordingly, document reading apparatus 1 can detect the rotational position of detection piece 197 by detecting whether the notch portion is located to face the detection position of rotational position sensor 310 or otherwise, based on a detection output from rotational position sensor 310. As a result, it can be detected whether the rotational position of shaft 192 is located at a particular position.

In the present embodiment, the rotational position of shaft 192 when cleaning member 191 is positioned before platen glass 211 as shown in FIG. 2 is called "home position" of cleaning roller 190. The notch portion of detection piece 197 is arranged to correspond to the home position of cleaning roller 190. Accordingly, whether cleaning roller 190 is at the home position is specified based on a detection output from rotational position sensor 310.

Any known methods can be employed for detection of the home position of the cleaning member in the document reading apparatus according to the present disclosure. The detection method described with reference to FIG. 2 is shown only by way of example and is not intended to limit the detection method in the present disclosure.

<Block Configuration of Document Reading Apparatus>

Figure 3:
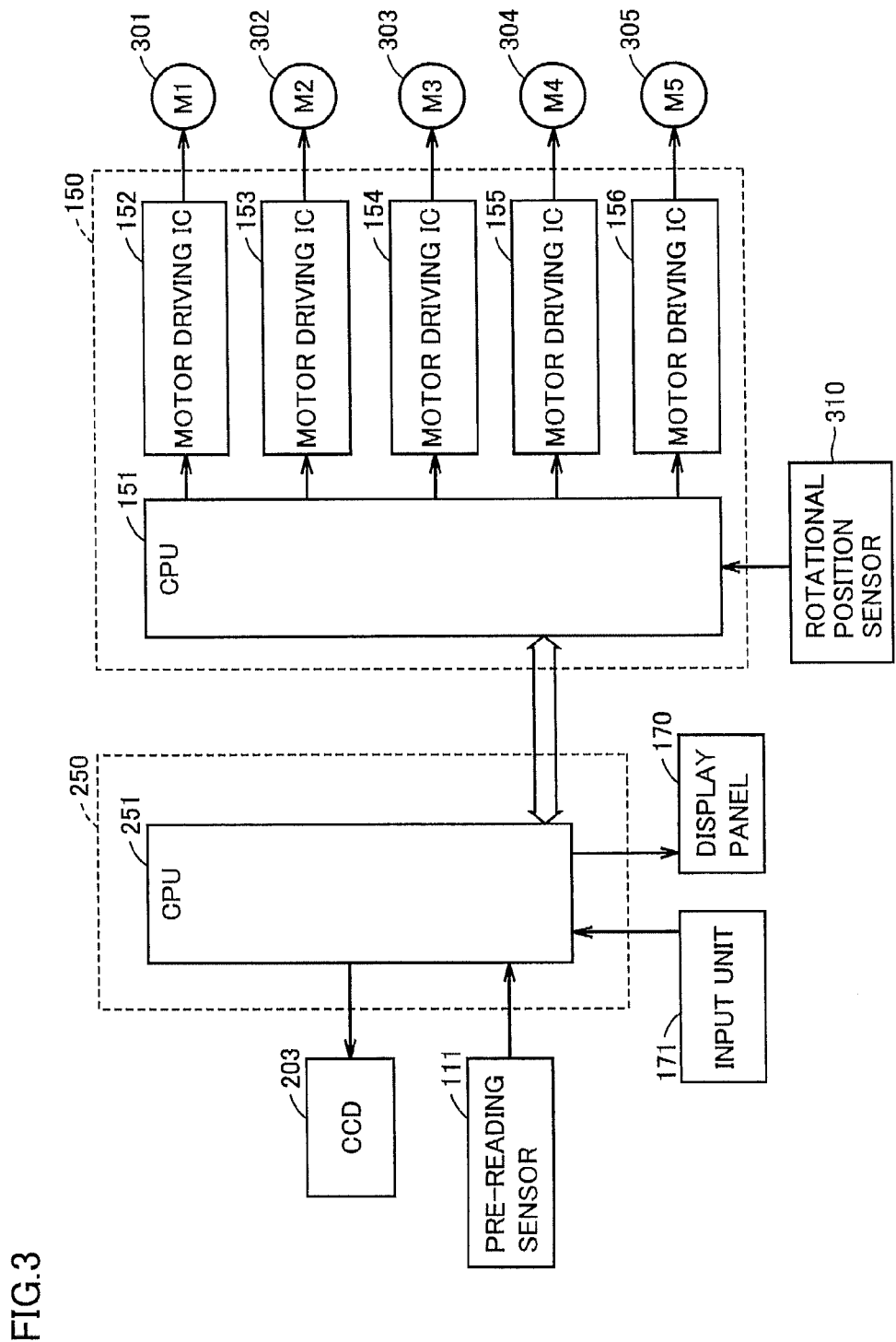
FIG. 3 shows an example of a block configuration of the document reading apparatus in FIG. 1.

Referring to FIG. 3, a block configuration of document reading apparatus 1 is described. FIG. 3 is a diagram showing an example of a block configuration of document reading apparatus 1.

As shown in FIG. 3, control device 150 of ADF unit 1A in document reading apparatus 1 includes a CPU (Central Processing Unit) 151 and motor driving ICs (Integrated Circuits) 152 to 156. Reading unit 1A further includes, in addition to motor 305 (see FIG. 2), motors 301 to 304 for rotating a variety of rollers.

Motor 301 is connected to pick-up roller 103 and paper feed roller 104A through a not-shown paper feed clutch to drive these rollers. Motor 302 is connected to one of the paired registration rollers 105 to drive the roller. The other registration roller 105 follows the rotation of the driven roller.

Motor 303 is connected to one of the paired pre-reading rollers 106 and one of the paired after-reading rollers 107 to drive these rollers. The other pre-reading roller 106 and the other after-reading roller 107 follow the rotation of the respective one rollers driven in the manner as described above.

Motor 304 is connected to one of the paired paper discharge rollers 109 to drive the roller. The other paper discharge roller 109 follows the rotation of the one of paper discharge rollers 109 that is driven in the manner as described above. Motor 304 is also connected to separating roller 104B through a not-shown rotational direction switching mechanism. Separating roller 104B is provided with a not-shown torque limiter. This provides separating roller 104B with a separating function of conveying paper sheet by sheet.

CPU 151 controls operation of motor driving ICs 152 to 156 in accordance with a signal input from CCD control device 250. Motor driving ICs 152 to 156 output drive signals to motors 301 to 305, respectively. CPU 151 executes the process described in this specification, including control of motor driving ICs 152 to 156, for example, by executing a program stored in a not-shown storage device.

CCD control device 250 of reading unit 1B includes a CPU 251. CPU 251 reads out and executes a program stored in a not-shown storage device, whereby CCD control device 250 fulfills the function as an image processing unit.

CCD 203 converts a light reception signal into RGB data through photoelectric conversion and outputs the RGB data to CCD control device 250. CCD control device 250 functioning as an image processing unit generates image data based on the RGB data output from CCD 203 and stores the generated image data into the storage device.

Document reading apparatus 1 further includes a display panel 170 for displaying, for example, an operation state of document reading apparatus 1, and an input unit 171 for accepting input of information to document reading apparatus 1. CPU 251 receives information input to input unit 171. CPU 251 also controls a display manner of display panel 170.

In generating image data of a document loaded in paper feed tray 101 in document reading apparatus 1, ADF unit 1A and reading unit 1B cooperate with each other. First, CPU 251 receives an instruction to start copy operation based on operation on input unit 171 (or input from an external device). In response, CPU 251 instructs ADF unit 1A to convey the document. In response, CPU 151 starts conveyance of the document by starting driving of the motors. CPU 250 generates image data of the document based on a light reception signal from CCD 203 after a particular time has passed since the timing when pre-reading sensor 111 detects passage of the document.

<Configuration on Periphery of Image Reading Unit>

Figure 4:
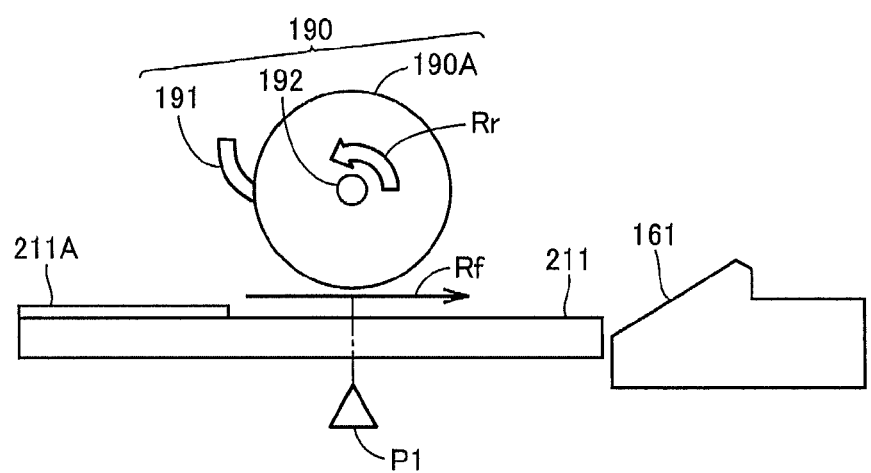
FIG. 4 is an enlarged view of the periphery of an image reading unit in the document reading apparatus in FIG. 1.

Referring to FIG. 4, a configuration on the periphery of the image reading unit in document reading apparatus 1 is described. FIG. 4 is an enlarged view of the periphery of the image reading unit in document reading apparatus 1.

As shown in FIG. 4, cleaning roller 190 is arranged on platen glass 211. In FIG. 4, arrow Rf indicates the document conveyance direction. In ADF unit 1A, the document is conveyed so as to pass through between platen glass 211 and cleaning roller 190. A step sheet 211A is arranged on platen glass 211 for conveying the document slightly isolated above from platen glass 211.

In FIG. 4, arrow Rr shows the rotational direction of cleaning roller 190. Cleaning roller body 190A rotates in the direction of arrow Rr about shaft 192. Accordingly, cleaning member 191 moves on platen glass 211 along the moving direction of the document conveyed on platen glass 211. A member 161 is provided downstream of platen glass 211 to send the document conveyed on platen glass 211 to the conveyance path as described above.

In FIG. 4, a mark P1 indicates a section to be read by reading unit 1B in the document conveyance direction. The optical path of reflection light of the exposure lamp shown with mirror group 202 in FIG. 1 is shown above mark P1.

Figure 5:
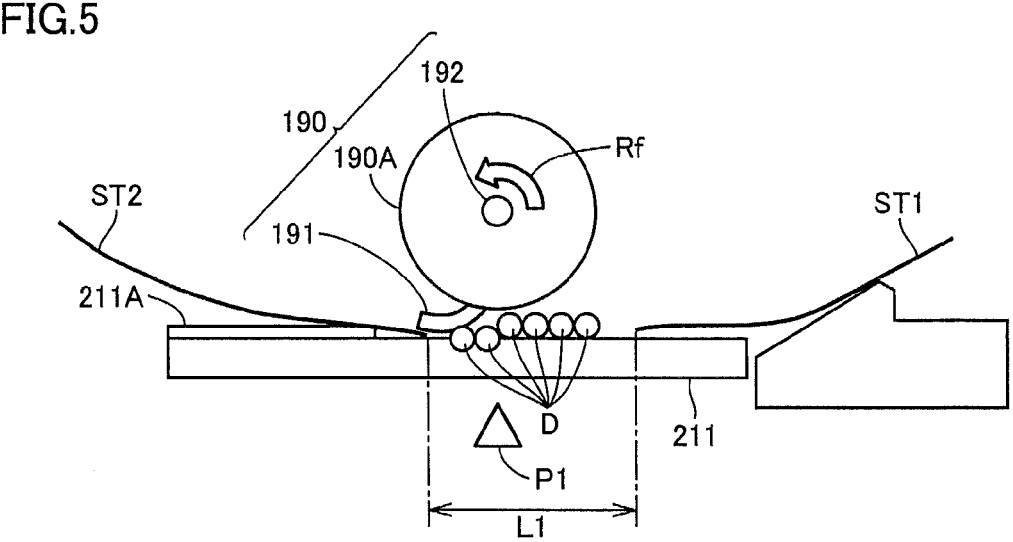
FIG. 5 and FIG. 6 schematically show a state in which a plurality of documents are successively conveyed in a document reading unit.
Figure 6:
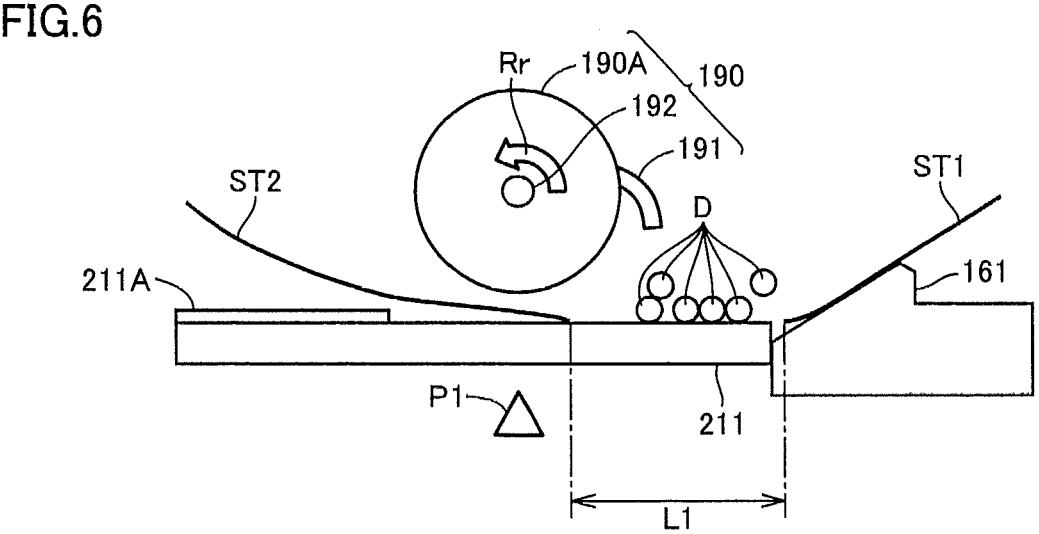

Referring to FIG. 5 and FIG. 6, successive conveyance of a plurality of documents in the document reading unit of document reading apparatus 1 as described with reference to FIG. 4 is described. FIG. 5 and FIG. 6 schematically show a state in which a plurality of documents are successively conveyed in the document reading unit of document reading apparatus 1.

FIG. 5 shows a document ST1 and a document ST2 conveyed on the conveyance path, following document ST1. A distance L1 shows the distance between the documents successively conveyed in document reading apparatus 1. Document reading apparatus 1 controls conveyance of documents such that the distance from the back end of document ST1 to the front end of document ST2 is distance L1 in the conveyance direction.

In document reading apparatus 1, cleaning member 191 comes into abutment with the front end portion of the document conveyed onto platen glass 211, upstream from the document reading position (the position shown by mark P1) by reading unit 1B. FIG. 5 shows paper dust D left on platen glass 211 as a result of conveyance of preceding documents.

Cleaning member 191 is formed of a material that can be flexed when coming into contact with platen glass 211 as shown in FIG. 5. Cleaning member 191 comes into abutment with the document on platen glass 211 from above and moves together with the document in the document conveyance direction. It is therefore necessary to avoid adherence of paper dust D to cleaning member 191 due to static electricity generated by cleaning member 191. For this reason, cleaning member 191 is formed of, for example, conductive nylon.

After bringing cleaning member 191 into contact with document ST2 from above, cleaning roller 190 is further rotated in the rotational direction indicated by arrow Rr in order to move cleaning member 191 in the conveyance direction so as not to inhibit the conveyance of document ST2. The timing of rotation of cleaning roller 190 is controlled in accordance with the timing of conveyance of a document on platen glass 211 (the timing of detection of passage of a document by pre-reading sensor 111).

Cleaning roller 190 is further rotated in the direction of arrow Rr from the state shown in FIG. 5, so that paper dust D on platen glass 211 is swept away downstream from the reading position of the platen glass 211. FIG. 6 shows the state in which the conveyance of document ST2 and the rotation of cleaning roller 190 proceed from the state shown in FIG. 5.

In FIG. 6, the front end portion of document ST2 is conveyed downstream from the reading position by reading unit 1B shown by mark P1. In FIG. 6, cleaning member 191 is positioned downstream from the front end of document ST2 and above document ST2.

As described above with reference to FIG. 5 and FIG. 6, cleaning member 191 comes into abutment with document ST2, conveyed onto platen glass 211, upstream from the reading position and from above document ST2. Cleaning member 191 then keeps the abutment with document ST2, thereafter overtakes document ST2, and sweeps away paper dust D, left on platen glass 211, downstream from the reading position. Paper dust D on platen glass 211 is thus removed from the reading position.

After the cleaning as described above, cleaning roller 190 has its rotational position back to the home position. When the next document is conveyed onto platen glass 211, similar cleaning is performed. More specifically, ADF unit 1A performs cleaning on platen glass 211 with cleaning member 191 as described above, for example, every time a document is conveyed onto platen glass 211.

<Cleaning Mechanism>

Figure 7:
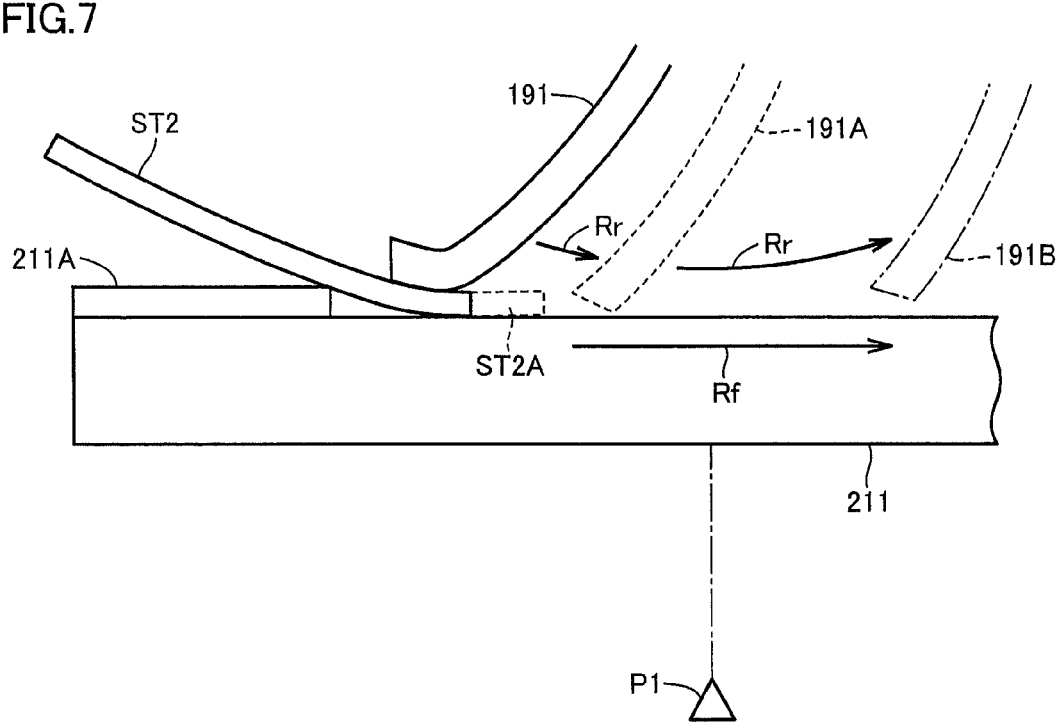
FIG. 7 illustrates a state in which a cleaning member comes into abutment with the front end of a document conveyed onto a platen glass in the document reading apparatus in FIG. 1.

Referring to FIG. 7, how cleaning member 191 comes into abutment with the front end of document ST2 conveyed onto platen glass 211 is described. FIG. 7 shows a state in which cleaning member 191 comes into abutment with the front end of document ST2 conveyed onto platen glass 211.

As shown in FIG. 7, the rotation timing of cleaning roller 190 is controlled such that cleaning member 191 reaches the position in abutment with the front end of document ST2 at a timing when document ST2 is conveyed onto platen glass 211.

As indicated by the solid line in FIG. 7, after cleaning member 191 comes into abutment with the front end portion of document ST2 in the conveyance direction, document ST2 is further conveyed to move to the position as denoted by a document ST2A. Here, cleaning member 191 is further rotated to move to the position as denoted by a cleaning member 191A. Cleaning member 191 is in abutment with the front end of document ST2 as indicated by the solid line in FIG. 7 initially when document ST2 is conveyed onto platen glass 211. Cleaning member 191 thereafter overtakes the front end portion of the document as denoted by document ST2A with the rotation of cleaning roller 190 and moves on platen glass 211 up to the position denoted by cleaning member 191A while being flexed in abutment with platen glass 211.

With further rotation of cleaning roller 190, the abutment between cleaning member 191 and platen glass 211 is released as denoted by a cleaning member 191B in FIG. 7. Cleaning member 191 thereafter moves upward.

<Comparison with Comparative Example>

Figure 8:
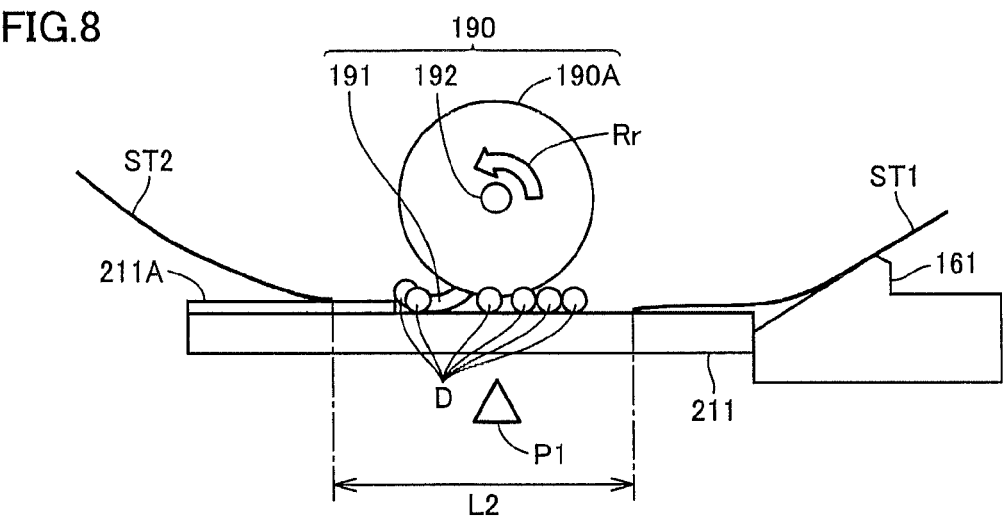
FIG. 8 and FIG. 9 illustrate a comparative example to the present embodiment.
Figure 9:
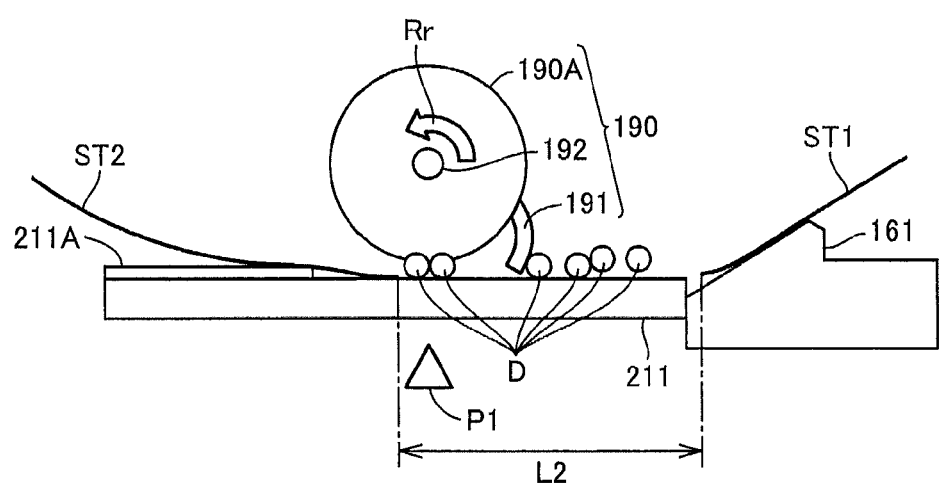
Figure 10:
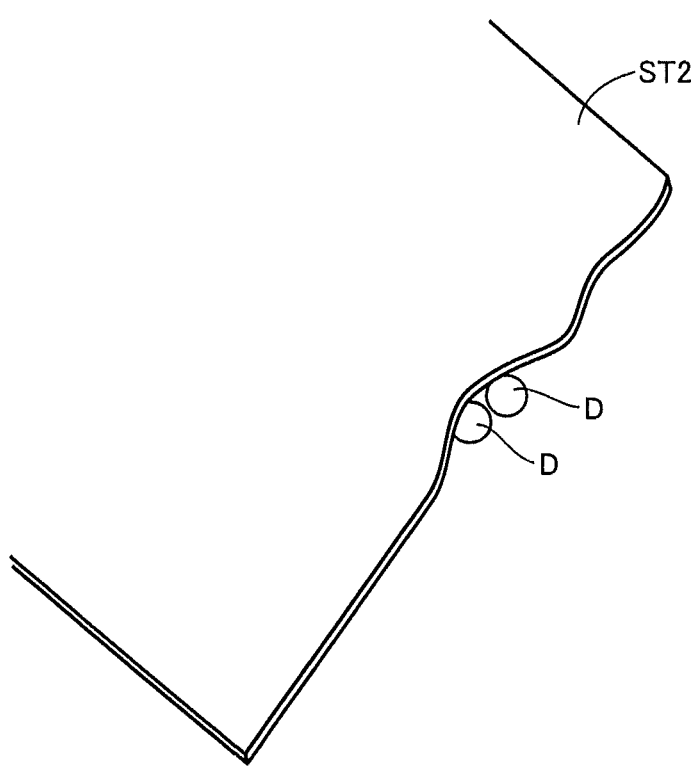
FIG. 10 shows that paper dust slips underneath a document in an image reading apparatus in the comparative example.

Referring to FIG. 8 to FIG. 10, a manner of cleaning the platen glass in a comparative example is described. FIG. 8 to FIG. 10 illustrate a manner of cleaning on platen glass 211 in a document reading apparatus in a comparative example.

FIG. 8 shows two document sheets (document ST1, document ST2) successively conveyed on platen glass 211. FIG. 8 shows the conveyance interval between the documents as a distance L2.

According to the comparative example, the document reading apparatus performs cleaning with cleaning roller 190 for a period after document ST1 passes through the reading position shown by mark P1 and before the following document ST2 is conveyed onto platen glass 211, that is, between the documents being conveyed. The cleaning with cleaning roller 190 means that cleaning member 191 moves in contact with platen glass 211 with the rotation of cleaning roller 190 to sweep away paper dust D on platen glass 211 downstream from the reading position.

In a case where paper dust D is present upstream from cleaning member 191 at a point of time when cleaning member 191 starts coming into contact with platen glass 211 (the state shown in FIG. 8), although paper dust D is partially swept away downstream of platen glass 211, the remaining paper dust D (paper dust D positioned upstream from cleaning member 191 in FIG. 8) is left in proximity to the reading position on platen glass 211, as shown in FIG. 9. In FIG. 9, the reading position is shown by mark P1. After that, when document ST2 is conveyed onto platen glass 211 as shown in FIG. 9, some of paper dust D left as described above slips underneath document ST2. A portion of document ST2 where light is blocked by paper dust D underneath document ST2 causes streak-like image noise in an image generated by reading unit 1B.

Referring to FIG. 10, the state in which paper dust D left upstream from the reading position slips underneath document ST2 is described. FIG. 10 shows the state in which paper dust D slips underneath document ST2 in the image reading apparatus in the comparative example.

As shown in FIG. 10, the front end of document ST2 conveyed onto platen glass 211 is conveyed while being slightly isolated from platen glass 211 by step sheet 211A. As a result, the front end of document ST2 may be partially warped in the direction intersecting the conveyance direction. As shown in FIG. 10, if paper dust D is positioned at the warped portion of the front end of document ST2, paper dust D slips underneath document ST2 as document ST2 is thereafter conveyed.

By contrast, in document reading apparatus 1 according to the present embodiment, as described above with reference to FIG. 5 and FIG. 7, when document ST2 is conveyed onto platen glass 211, the front end with respect to the conveyance direction is pushed down by cleaning member 191. This prevents the warpage of the front end portion as described above with reference to FIG. 10. Document reading apparatus 1 according to the present embodiment can therefore avoid intrusion of paper dust D underneath document ST2.

<Timing Control of Rotation of Cleaning Roller>

Figure 11:
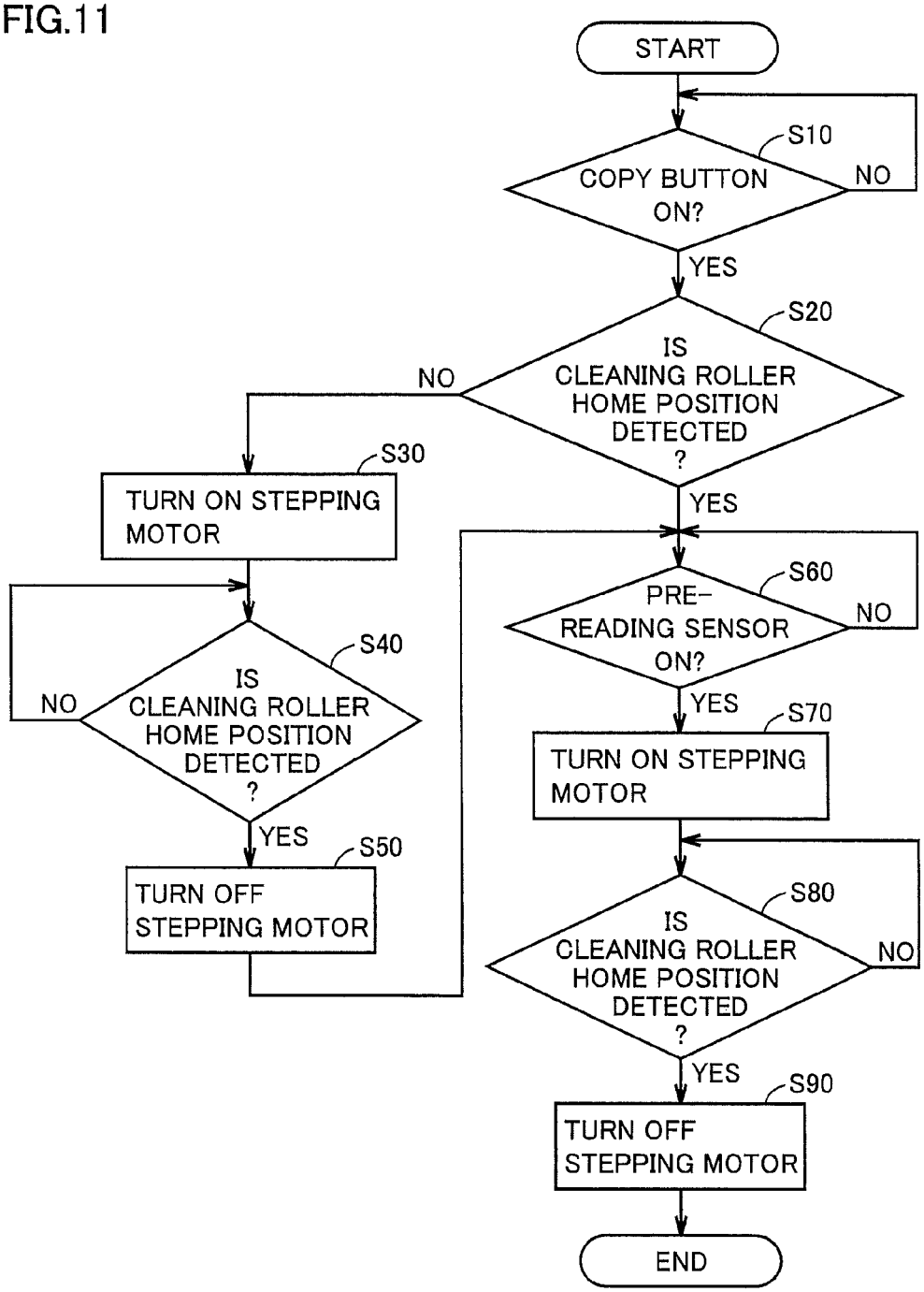
FIG. 11 is a flowchart of a process executed in an ADF (Auto Document Feeder) unit for rotating the cleaning roller in synchronization with a timing of conveying a document onto the platen glass.

Referring to FIG. 11, a process for rotating cleaning roller 190 in synchronization with the timing of conveying a document onto platen glass 211 as described above with reference to FIG. 5 to FIG. 7 is described. FIG. 11 is a flowchart of this process.

As shown in FIG. 11, first, in step S10, CPU 151 determines whether a copy button that is a part of input unit 171 is operated. If it is determined that it is operated, the process proceeds to step S20. The copy button is a button operated to instruct document reading apparatus 1 to start document reading operation. If the copy button is operated, a signal based on this operation is input to CPU 251. Upon receiving the signal, CPU 251 transmits the signal to that effect to CPU 151.

In step S20, CPU 151 determines whether cleaning roller 190 is at the home position. If it is determined so, the process proceeds to step S60. If it is determined that it is not at the home position, the process proceeds to step S30. Whether cleaning roller 190 is at the home position is determined based on a detection output from rotational position sensor 310.

In step S30, CPU 151 turns ON driving of the stepping motor (motor 305). The process then proceeds to step S40.

In step S40, CPU 151 determines whether cleaning roller 190 is at the home position, in a similar manner as in step S20. If it is determined that it is at the home position, the process proceeds to step S50.

In step S50, CPU 151 turns OFF driving of the stepping motor (motor 305), which is turned ON in step S30. The process then proceeds to step S60

Through the processing in step S30 to step S50, when the rotational position of cleaning roller 190 is not at the home position, motor 305 is driven until the home position is reached.

In step S60, CPU 151 determines whether pre-reading sensor 111 detects the presence of a document (whether the detection output thereof is ON). If it is determined so, the process proceeds to step S70.

In step S70, CPU 151 turns ON driving of the stepping motor (motor 305). The process then proceeds to step S80.

In step S80, CPU 151 determines whether the rotational position of cleaning roller 190 is at the home position, in a similar manner as in step S20. If it is determined that the home position is reached, the process proceeds to step S90.

In step S90, CPU 151 turns OFF driving of the stepping motor (motor 305), which is turned ON in step S70. The process then ends.

In document reading apparatus 1 in the present embodiment above, upon receiving an instruction to start a copy, a process for conveying a document is executed concurrently with the process described above with reference to FIG. 11. In this process, conveyance of a document is started in response to an instruction to start copy. It is then determined whether the rotational position of cleaning roller 190 is at the home position. If not at the home position, motor 305 is driven until the home position is reached, and rotation of cleaning roller 190 is thereafter started in synchronization with the document conveyance timing (step S60).

Cleaning roller 190 is designed such that the home position of the rotational position thereof and the attachment position of cleaning member 191 satisfy the relationship with the front end of a document as described above mainly referring to FIG. 5 to FIG. 7.

Accordingly, in document reading apparatus 1, cleaning member 19 comes into abutment with the front end of the document conveyed onto platen glass 211. At the reading position, cleaning member 19 passes through the front end of the document and sweeps away paper dust D, left on platen glass 211, downstream from the reading portion of platen glass 211. Meanwhile, the document reaches the reading position, and the image of the document starts being read in reading unit 1B.

In document reading apparatus 1 configured as described above, paper dust D adhering to the front end portion of the document can be mostly swept away downstream from the reading position before the document is read.

<Release of Abutment Between Cleaning Roller and Document>

As described above mainly referring to FIG. 7, after cleaning member 191 comes into abutment with the front end of the document, shaft 192 is rotated to cause cleaning member 191 to overtake the front end of the document upstream from the reading position. Cleaning member 191 in abutment with platen glass 211 then sweeps away paper dust D downstream from the reading position. The position where the abutment between cleaning member 191 and the document is released may be downstream from the reading position.

Figure 12:
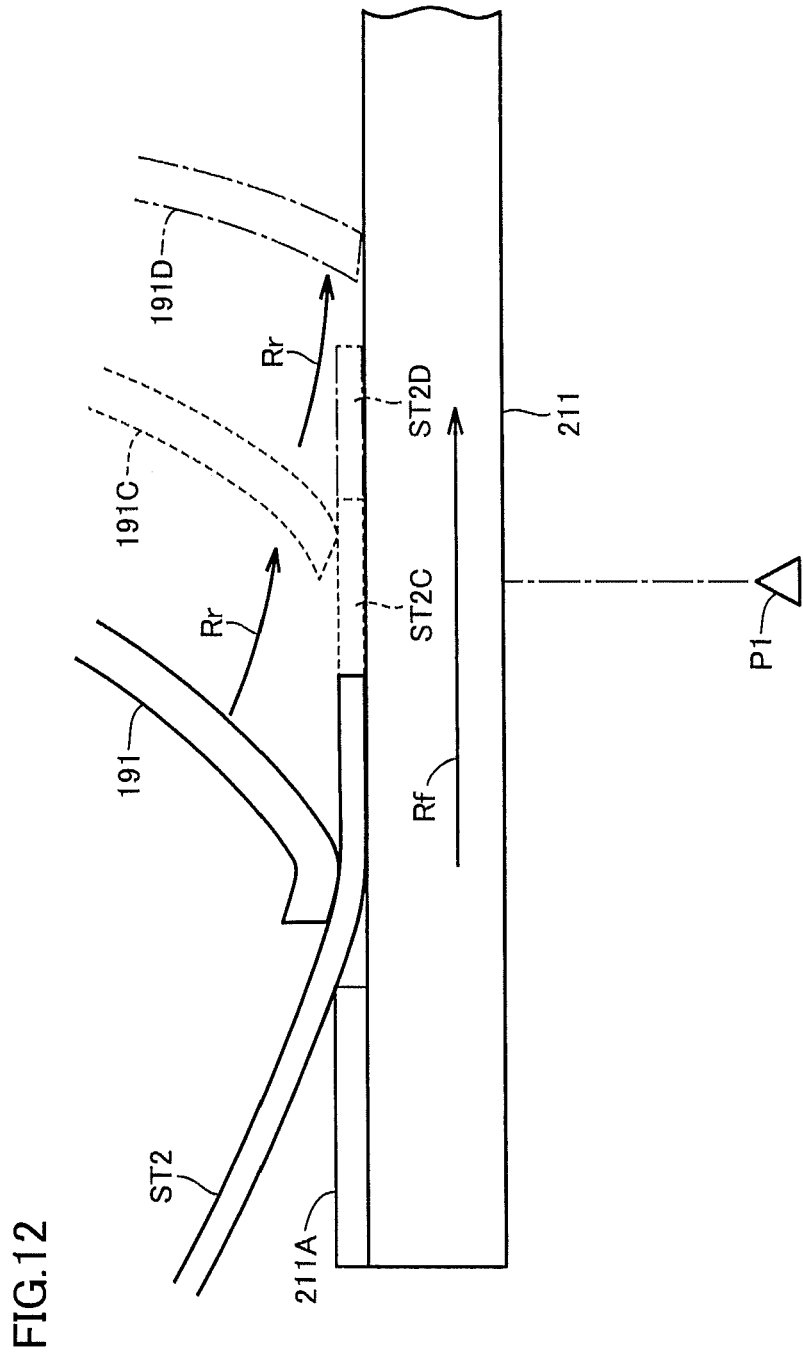
FIG. 12 illustrates an example in which abutment between the cleaning member and a document is released downstream from the reading position.

Referring to FIG. 12, release of the abutment between cleaning member 191 and the document is described. FIG. 12 shows an example in which the abutment is released downstream from the reading position.

As shown by the solid line in FIG. 12, cleaning member 191 is in abutment with the front end of document ST2 conveyed onto platen glass 211. Thereafter, the conveyance of document ST2 and the rotation of cleaning roller 190 are continued, so that document ST2 and cleaning member 191 move in the conveyance direction (arrow Rf) with the abutment state shown by the solid line being kept on. The front end of document ST2 moves up to the position as denoted by document ST2C, while cleaning member 191 moves up to the position as denoted by cleaning member 191C. With further rotation of cleaning roller 190, cleaning member 191 overtakes document ST2C and comes into abutment with platen glass 211.

In FIG. 12, the position of cleaning member 191 coming into abutment with platen glass 211 is indicated as cleaning member 191D. The position of document ST2 at this point in time is indicated as document ST2D.

In the present modification, the abutment between document ST2 and cleaning member 191 is not released until the downstream side from the reading position. In this manner, document ST2 passes through the reading position with cleaning member 191 pushing down the front end portion of document ST2, thereby reliably suppressing warpage and isolation of the front end of document ST2. Accordingly, adherence of paper dust D onto platen glass 211 can be prevented.

<Conditions Including Rotational Velocity of Cleaning Roller>

The condition of the rotational velocity of cleaning roller 190 in the present embodiment is examined in relation to the conveyance velocity of a document. In the following description, the conveyance velocity of a document is represented by "velocity Vf." The rotational velocity of cleaning roller 190 (the rotational velocity of cleaning roller body 190A, for example) is represented by "velocity Vr." Referring to FIG. 13, the relationship between the rotational velocity of cleaning roller 190 and the moving velocity of cleaning member 191 in the document conveyance direction is described.

Figure 13:
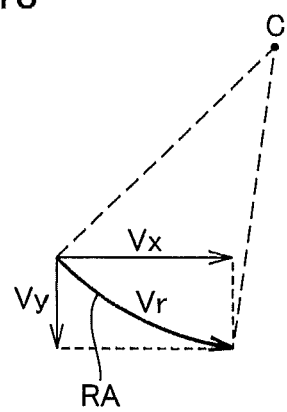
FIG. 13 and FIG. 14 illustrate the conditions for the rotational velocity of the cleaning roller in the document reading apparatus in FIG. 1.

The rotational velocity of cleaning roller 190 can be assumed as the length of an arc that is the path of movement of the front end portion of cleaning member 191 per unit time, as shown in FIG. 13. In FIG. 13, a point C shows the center of rotation of cleaning roller 190. An arc RA shows the path of movement of the front end portion of cleaning member 191 by the rotation of cleaning roller 190 per unit time.

In document reading apparatus 1, the document is conveyed approximately horizontally on platen glass 211, for example, as shown by arrow Rf in FIG. 4. In the following, to examine of rotational velocity Vr of cleaning roller 190 based on the relation to the document conveyance velocity, the velocity indicated by arc RA is decomposed into a component Vx along the document conveyance direction and a component Vy in the direction intersecting the conveyance direction. In this case, component Vx along the conveyance direction corresponds to the moving velocity of cleaning member 191 with respect to the document conveyance direction.

Figure 14:
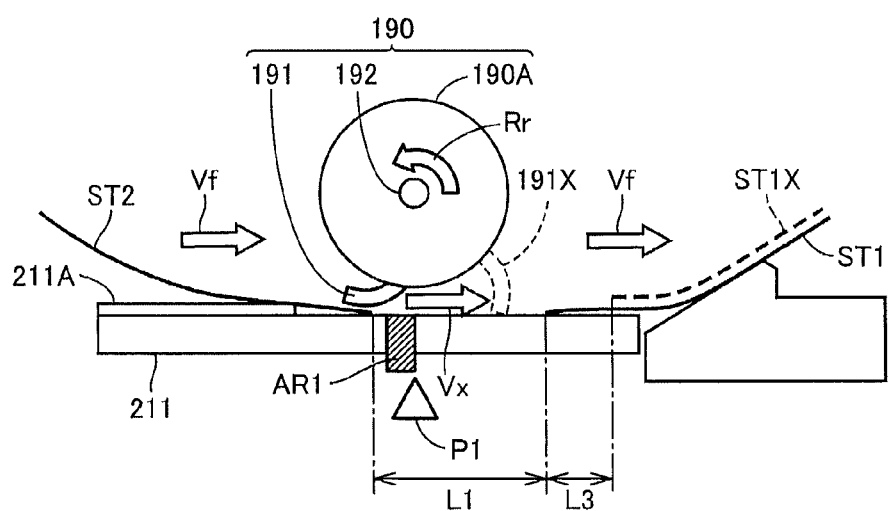

The principal condition for the rotational velocity of cleaning roller 190 is that after cleaning member 191 comes into abutment with the front end of the document, cleaning member 191 should be moved in the document conveyance direction at a velocity higher than the conveyance velocity of the document being conveyed. In other words, as shown in FIG. 14, when the moving velocity of cleaning member 191 is represented by component Vx and the document conveyance velocity is represented by velocity Vf, it is required that component Vx should be equal to or higher than velocity Vf. If the moving velocity of cleaning member 191 is lower than the document conveyance velocity, the conveyance of the document is inhibited by cleaning member 191, which presumably results in damage to the document.

The next condition is that the rotational velocity of cleaning roller 190 should be set such that cleaning member 191 in abutment with platen glass 211 does not overtake the back end of the document previously conveyed. This is to avoid cleaning member 191 from coming into contact with the back end of the preceding document and thus damaging the preceding document.

Here, letting t be the time during which cleaning member 191 is in abutment with the document or platen glass 211 by the rotation of cleaning roller 190, the distance at which cleaning roller 190 moves in the document conveyance direction on platen glass 211 is represented by the product of component Vx of rotational velocity Vr and time t, that is, "Vx×t".

The distance (L11) from the position where cleaning member 191 comes into abutment with the front end of document ST2 to the position where the back end of document ST1 (the document conveyed previously to document ST2) is present, time t after the abutment, is represented by the sum of the distance from the front end of document ST2 to the back end of document ST1 at the start of the abutment (that is, distance L1 noted above) and the distance at which the back end of document ST1 moves in the conveyance direction during time t since then, that is, the product of conveyance velocity Vf and time t (Vf×t). In short, distance L11 can be calculated based on an expression "Vf×t+L1".

The expression "Vf×t+L1" is represented by an expression "L3+L1" in FIG. 14. In FIG. 14, ST1X represents the back end portion of document ST1 time t after the abutment with cleaning member 191. Distance L3 represents the distance from the back end of document ST1 to the back end of document ST1X.

The condition of the velocity for preventing cleaning member 191 in abutment with the front end of document ST2 or platen glass 211 from overtaking the back end of document ST1 during time t can be represented by the following expression (1).

$$Vx \times t < Vf \times t + L1 \tag{1}$$

Based on the foregoing, the condition for rotational velocity Vr of cleaning roller 190 in document reading apparatus 1 is that component Vx satisfies the expression (1) above. The condition also includes that component Vx is equal to or higher than velocity Vf.

<Other Modifications>

In the foregoing embodiment, cleaning member 191 starts abutment with the front end of document ST2 conveyed onto platen glass 211, upstream from the reading position (see, for example, FIG. 5 and FIG. 7). In this case, in order to ensure removal of paper dust D at the reading position, it is preferable that the abutment is started upstream from the reading position at least by a distance (the size of a region in the conveyance direction as denoted by a region AR1 in FIG. 14) at which continuation of the abutment (the contact between the document and cleaning member 191) is required for cleaning. Here, the distance at which continuation of the contact is required is expected to be changed depending on various conditions such as materials of platen glass 211 and documents. An example of the distance is the size of paper dust D presumably present on platen glass 211, plus a predetermined margin.

In the present embodiment as described above, cleaning roller 190 as well as CPU 151, motor driving circuit IC 156, and motor 305 as described with reference to FIG. 5 etc. in conjunction with cleaning roller 190 constitute removing means for removing foreign substances on the platen glass.

According to this disclosure, the cleaning member is arranged on the outer periphery of the cleaning roller body and is flexed when coming into contact with the platen glass. The cleaning member comes into contact with a document conveyed on the platen glass at the front end thereof with respect to the document conveyance direction. This avoids paper dust left on the platen glass from introducing underneath the document from the warped portion at the front end portion of the document. This avoids the situation in which the paper dust intruding underneath the document is conveyed together with the document on the platen glass to cause streak noise in the document image and the situation in which the paper dust is left on the platen glass after cleaning with the cleaning member.

According to this disclosure, the cleaning member starts abutment with the document on the platen glass, upstream from the reading position, and moves on the platen glass with the document being conveyed. This eliminates warpage of the front end portion of the document upstream form the reading position in the document reading apparatus. The cleaning member can therefore reliably move paper dust at the reading position or upstream therefrom, toward the downstream side, by means of the document or the cleaning member per se.

The cleaning member according to this disclosure is not necessarily arranged on the outer periphery of a roller-like member (cleaning roller) as illustrated in the foregoing embodiment, as long as the cleaning member is moving while at least satisfying the relationship with the front end of the moving document conveyed on the platen glass as illustrated in the foregoing embodiment. The cleaning member may be attached to a support body moving parallel to the main surface of the platen glass, rather than being attached to the cleaning roller. Preferably, the distance between the support body and the main surface of the platen glass can be changed.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A document reading apparatus comprising a conveyance unit for conveying a document and a reading unit for reading an image of a document, said reading unit including a platen glass, said conveyance unit including a removal unit for removing foreign substances on said platen glass, and a processor configured to control conveyance of a document on said platen glass and operation of said removal unit, said removal unit including a cleaning roller arranged to be able to rotate on said platen glass, said cleaning roller including:

a cleaning roller body arranged along said platen glass throughout an entire length of said platen glass in a direction intersecting a conveyance direction of a document by said conveyance unit, for rotating not in contact with said platen glass; and a cleaning member arranged on an outer periphery of said cleaning roller body along said platen glass throughout the entire length of said platen glass in said direction intersecting said conveyance direction, said cleaning member being flexed when coming into contact with said platen glass, wherein said processor is configured to allow said cleaning member to start removal of foreign substances on said platen glass by bringing said cleaning member into contact with a front end of a document in said conveyance direction conveyed by said conveyance unit, on said platen glass, upstream in said conveyance direction from a reading position by said reading unit.

2. The document reading apparatus according to claim 1, wherein said processor is configured to allow said cleaning member to move such that said cleaning member comes into contact with said front end of a document on said platen glass and said cleaning member thereafter overtakes the document conveyed on said platen glass.

3. The document reading apparatus according to claim 1, wherein said processor is configured to allow said cleaning member to move such that said cleaning member starts contact with a document conveyed by said conveyance unit, on said platen glass, upstream from said reading position at least by a size with which cleaning is required.

4. The document reading apparatus according to claim 1, wherein a component Vr in said conveyance direction of a rotational velocity of said cleaning roller satisfies the following expression (A):

$$Vr \times t < Vp \times t + L1 \qquad (A)$$

where Vp is a conveyance velocity of a document by said conveyance unit, L1 is a conveyance interval between documents, and t is a time during which said cleaning member is in abutment with said platen glass when said cleaning roller is rotated according to said Vr.

5. The document reading apparatus according to claim 1, wherein said processor is configured to allow said cleaning member to move such that contact between said cleaning member and a document conveyed by said conveyance unit is released downstream in said conveyance direction from said reading position.

6. A method of controlling a document reading apparatus including a conveyance unit for conveying a document and a reading unit for reading an image of a document,
said reading unit including a platen glass,
said conveyance unit including a removal unit for removing foreign substances on said platen glass, and a processor configured to control conveyance of a document on said platen glass and operation of said removal unit,
said removal unit including a cleaning roller arranged to be able to rotate on said platen glass,
said cleaning roller including a cleaning roller body arranged along said platen glass throughout an entire length of said platen glass in a direction intersecting a conveyance direction of a document by said conveyance unit, for rotating not in contact with said platen glass, and a cleaning member arranged on an outer periphery of said cleaning roller body along said platen glass throughout the entire length of said platen glass in said direction intersecting said conveyance direction, said cleaning member being flexed when coming into contact with said platen glass,
said method comprising the step of allowing, by said processor, said cleaning member to start removal of foreign substances on said platen glass by bringing said cleaning member into contact with a front end of a document in said conveyance direction conveyed by said conveyance unit, on said platen glass, upstream in said conveyance direction from a reading position by said reading unit.

7. The method according to claim 6, further comprising the step of allowing, by said processor, said cleaning member to move such that said cleaning member comes into contact with said front end of a document on said platen glass and said cleaning member thereafter overtakes the document conveyed on said platen glass.

8. The method according to claim 6, further comprising the step of allowing, by said processor, said cleaning member to move such that said cleaning member starts contact with a document conveyed by said conveyance unit, on said platen glass, upstream from said reading position at least by a size with which cleaning is required.

9. The method according to claim 6, wherein a component Vr in said conveyance direction of a rotational velocity of said cleaning roller satisfies the following expression (A):

$$Vr \times t < Vp \times t + L1 \qquad (A)$$

where Vp is a conveyance velocity of a document by said conveyance unit, L1 is a conveyance interval between documents, and t is a time during which said cleaning member is in abutment with said platen glass when said cleaning roller is rotated according to said Vr.

10. The method according to claim 6, further comprising the step of allowing, by said processor, said cleaning member to move such that contact between said cleaning member and a document conveyed by said conveyance unit is released downstream in said conveyance direction from said reading position.

* * * * *